United States Patent Office 3,007,350
Patented Nov. 7, 1961

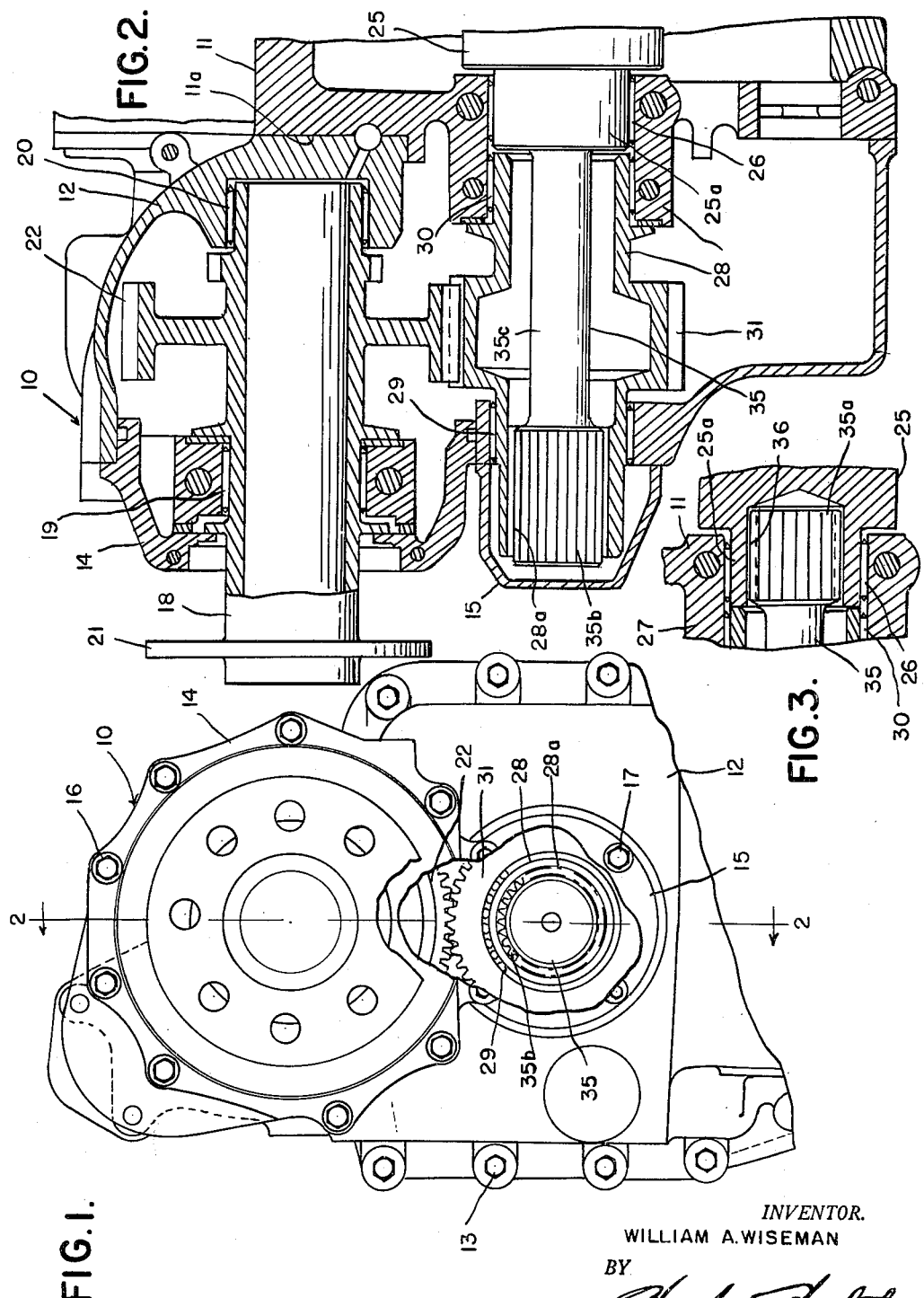

3,007,350
ENGINE CONSTRUCTION
William A. Wiseman, Muskegon, Mich., assignor to Continental Motors Corporation, Detroit and Muskegon, Mich., a corporation of Virginia
Filed Feb. 7, 1958, Ser. No. 713,846
2 Claims. (Cl. 74—574)

My invention relates to construction of internal combustion engines for propeller driven aircraft, and more particularly to a simplified means for tuning torsional vibrations.

In propeller driven aircraft, natural resonant frequencies of the engine inherent at certain particular speeds induce such a build-up of harmonic vibrations that propeller blades, particularly at the blade tips, suffer very high stresses, reducing fatigue life and sometimes causing propeller damage in flight, a dangerous condition which engine manufacturers must guard against continually.

Generally, in developing an engine, a number of vibration dampeners are secured to the crankshaft within the crankcase, being designed to eliminate all vibrations by direct action on the crankshaft. However, in smaller engines, the dampeners represent additional weight and cost, and various changes which may afterward be made in the engine may require costly redesign, replacement, and re-positioning of the dampeners to eliminate newly-induced resonant vibrations.

Since the serious aspect of aircraft engine vibrations is the fact that harmonic torsional vibrations are transmitted to the propellers, the present invention conceives of providing a torsion quill at the driving end of the crankshaft.

More particularly, an object of the present invention is to simplify engine construction by transferring the functions of most of the crankshaft vibration dampeners to a single simplified torsion quill interposed in the drive chain between the crankshaft and the propeller.

Another object of the invention is to eliminate torsional harmonic vibrations induced in the aircraft propeller by providing a torsion quill on the driving end of the crankshaft and so constructed to tune harmonic vibrations that the vibrations only occur at non-critical engine speeds.

A further object of the invention is to simplify the tuning of harmonic torsional vibrations transmitted to the aircraft propeller by constructing a readily accessible torsion quill interposed between the crankshaft driving end and the propeller shaft reduction gearing and disposed concentrically within the propeller driving gear shaft in the gearcase.

A still further object of the invention is to simplify the construction, assembly and maintenance of a torsion quill-tuned power transmission for engines by providing a readily separable gear shaft and quill assembly in which operation of the shafts will not affect the functioning of the quill.

For a more complete understanding of the invention, reference may be had to the accompanying drawing illustrating a preferred embodiment of the invention in which like reference characters refer to like parts throughout the several views and in which FIG. 1 is a fragmentary front end elevational view of a preferred aircraft engine embodying the present invention.

FIG. 2 is a cross-sectional view of the forward section of the engine taken on the line 2—2 of FIG. 1, and FIG. 3 is a fragmentary detail showing a modified construction.

The forward portion of an internal combustion engine 10 for a propeller driven aircraft is illustrated in part as having a crankcase structure 11 provided with a mounting face 11a on which is secured a gear housing 12 by any means such as bolts 13. An upper cap 14 and a lower cap 15 are secured to the gear housing 12 by any means such as bolts 16 and 17 respectively.

A propeller shaft 18 is rotatably mounted by bearings 19 and 20 in the upper portion of the gear housing 12, projecting forward through the upper cap 14 and having a flange 21 adapted for securing a propeller thereto. A driven gear 22 is preferably integrally formed with a medial portion of the shaft 18 disposed inside the gear housing 12.

A crankshaft 25 has its driving end 25a supported by a bearing 26 in a boss 27 provided on the mounting face 11a of the crankcase 11. A hollow drive shaft 28 is rotatably supported at its outer end by a bearing 29 carried by the gear housing 12 and at its inner end by a bearing 30 carried in the boss 27 adjacent the bearing 26. A driving gear 31 is preferably integrally formed with a medial portion of the drive shaft 28 and is drivingly connected with the propeller shaft gear 22 as shown.

Harmonic torsional vibrations, induced by the natural resonant frequency of the engine at particular speeds which might otherwise be transmitted through the shafts 28 and 18 and their gears 31 and 22 to the propeller are tuned out of that particular speed range by means of a torsion quill 35 disposed concentrically within the hollow drive shaft 28. The torsion quill 35 may be integrally formed with the driving end 25a of the crankshaft 25, as shown in FIG. 2, or may be provided with an enlarged inner spline end 35a, as shown in FIG. 3, secured in a splined bore 36 provided in the driving end 25a of the crankshaft 25. The splined arrangement of FIG. 3 permits ready removal and replacement of the torsion quill 35 through the opening of the gear housing 12 covered by the lower cap 15.

Moreover, the separate bearing mountings for the shaft 28 and the quill 35, provide for easier maintenance and also avoid back-lash or other effects of shaft operation from being transmitted to the inner end of the quill 35, which otherwise could affect its functioning.

An enlarged outer spline end 35b of the torsion quill 35 is secured to an outer spline end 28a of the drive shaft 28 to complete the drive chain from the crankshaft 25 to the propeller shaft 18. A medial portion 35c of the torsion quill 35 between the ends is constructed to provide the required tuning effect on predetermined harmonic torsional vibrations. In effect, the natural resonant frequency of the engine as a whole, including the gear train and propeller, is changed such that harmonic vibrations tend to build up only in a speed range at which the engine doesn't normally operate for any length of time. The engine speed at which these harmonic vibrations are normally encountered and the position in the engine speed range to which these torsional vibrations are desired to be shifted will determine the desired length, diameter and the material of the quill portion 35c. As seen, simple outer diameter machining of the quill 35 is all that is required, depending on the vibration to be tuned. Thus, instead of dampening out torsional vibrations that occur at critical engine speeds, a tuning effect is achieved, in which any tendency for torsional vibrations to be amplified is shifted to a different engine speed range at which the engine will rarely, and even then only momentarily, operate. The injurious buildup of harmonic vibrations thus will never occur at the critical engine operating speeds.

The quill 35 being disposed within the drive shaft 28 permits the use of such tuning quill without increasing engine weight or changing the construction of the gear housing 12 for adapting the device to the engine.

Although I have described only one preferred embodiment of the invention, it will be apparent to one skilled in the art to which the invention pertains that various changes and modifications may be made therein without departing from the spirit of the invention or the scope of the appended claims.

I claim:

1. In an internal combustion engine for a propeller driven aircraft, an engine crankcase having a planar mounting wall and a forwardly projecting hub having a single bore of the same diameter throughout its entire length, said bore having a pair of substantially identical axially spaced separate bearing means and both disposed entirely in said bore, a crankshaft supported by said engine crankcase, one of said bearing means rotatably supporting one end of said crankshaft, a gear housing mounted on said mounting wall, said crankshaft having an axially extending torsion quill extending into said gear housing, said gear housing having a bearing means substantially structurally and dimensionally identical to the pair of separate spaced bearing means in said bore and axially aligned and spaced with respect to the pair of separate bearing means in said bore, said gear housing having a second pair of axially spaced bearing means laterally offset from the first mentioned bearing means in said gear housing, a propeller shaft having a driven gear rotatably supported by said second pair of axially spaced bearing means, a hollow tubular driving gear shaft in said gear housing and rotatably supported in said first bearing means in said gear housing and said other of said bearing means in the bore of said mounting wall, said driving gear shaft having a driving gear meshing with the propeller shaft driven gear, said driving gear shaft and said torsion quill splined together at their ends remote from said mounting wall, said gear housing and assembled propeller drive shaft disposed for endwise axial assembly with said engine into position for abutting assembly with said mounting wall and for driving engagement with said driving gear shaft as previously assembled to said torsion quill and said mounting wall, said torsion quill shaft being constructed and arranged to tune torsional harmonic vibrations from one engine speed range to a different engine speed range.

2. An internal combustion engine reduction gearing and gear housing structure as defined in claim 1, wherein all bearing means in said mounting wall bore and said housing for supporting the forward end of said driving gear shaft have substantially equal outer and inner diameters to facilitate the aforesaid axial assembly of said gear housing as heretofore set forth.

References Cited in the file of this patent

UNITED STATES PATENTS

| | | |
|---|---|---|
| 1,961,679 | Wälti | June 5, 1934 |
| 1,965,742 | Junkers | July 10, 1934 |
| 2,133,102 | Kuhns | Oct. 11, 1938 |
| 2,214,921 | Criswell | Sept. 17, 1940 |
| 2,369,679 | Matteuci | Feb. 20, 1945 |
| 2,407,114 | Tyler et al. | Sept. 3, 1946 |
| 2,441,446 | Schmitter | May 11, 1948 |
| 2,698,013 | Brill et al. | Dec. 28, 1954 |
| 2,698,526 | Beier | Jan. 4, 1955 |
| 2,736,819 | Murray | Feb. 28, 1956 |

FOREIGN PATENTS

| | | |
|---|---|---|
| 801,790 | France | May 23, 1936 |